United States Patent [19]
Barab-Tarle et al.

[11] Patent Number: 4,804,914
[45] Date of Patent: Feb. 14, 1989

[54] METHOD FOR DETERMINING FORCE CHARACTERISTIC OF A DEVICE FOR MAGNETICALLY HOLDING WORKPIECES

[75] Inventors: Matus E. Barab-Tarle; Arkady Y. Vernikov; Mikhail P. Rashkovich; Romen D. Soifer; Boris A. Trostanovsky; Alexandr S. Khinkus, all of Odessa, U.S.S.R.

[73] Assignee: Odesskoe skb Spetsialnykh Stankov, Odessa, U.S.S.R.

[21] Appl. No.: 931,442

[22] PCT Filed: Feb. 13, 1985

[86] PCT No.: PCT/SU85/00015

§ 371 Date: Oct. 7, 1986

§ 102(e) Date: Oct. 7, 1986

[87] PCT Pub. No.: WO86/04851

PCT Pub. Date: Aug. 28, 1986

[51] Int. Cl.⁴ .................. G01R 33/12; G01L 1/00
[52] U.S. Cl. .................. 324/226; 73/862.51; 324/205; 324/262
[58] Field of Search .............. 324/200, 202, 205, 226, 324/228–243, 260, 262; 73/1 B, 862.51, 862.53

[56] References Cited
U.S. PATENT DOCUMENTS
4,465,975 8/1984 Porter .................. 324/207 X

OTHER PUBLICATIONS

O.Ya. Konstantinov "Raschet i konstruirovanie magnitnykh i elektromagnitnykh prisposobleny", 1967, Mashinostroenie (Leningrad), cf. 80–83.
NIIMash, seria 0–1 Stankostroenie, 1982 (Moskva): O. F. Poltavets et al, "Metody i sredstva kontrolya tochnosti parametrov korpusnykh detaley", cf. pp. 32, 33.
Entsiklopedia sovremennoi tekhniki. Avtomatizatsia proizvodstva i promyshlennaya elektronika, vol. I, 1962, Sovetskaya Entsiklopedia (Moskva), cf. pp. 281–282.

Primary Examiner—Gerard R. Strecker
Attorney, Agent, or Firm—Fleit, Jacobson, Cohn & Price

[57] ABSTRACT

A method for determining force characteristic of a device for magnetically holding workpieces placed on a top plate (3) of the device, wherein a workpiece (1) cooperating with a source of magnetic field of the device is connected to a force pick-up (2) and is caused to move along the top plate (3), along a test line (4). The source of magnetic field remains permanently energized during the tests, the workpiece (1) is placed in parallel with the top plate (3) with a clearance which depends on sensitivity of the force pick-up (2), and is caused to move along the test line (4) continually while maintaining the amount of the clearance substantially unchanged.

1 Claim, 3 Drawing Sheets

METHOD FOR DETERMINING FORCE CHARACTERISTIC OF A DEVICE FOR MAGNETICALLY HOLDING WORKPIECES

FIELD OF THE ART

The invention relates to machine tool engineering, and in particular, it deals with methods for determining force characteristic of a device for magnetically holding workpieces.

STATE OF THE ART

The main characteristic of devices for magnetically holding workpieces is a force characteristic, i.e., distribution of the force of attraction of workpieces over the surface of a plate which makes it possible to evaluate capabilities of the device and quality of its manufacture.

It is important to reveal, in such distribution of force, values and zones of minimum attraction forces to be used in setting forth machining conditions for workpieces being held, and also the character of distribution which determines magnetic deformations of parts, and hence, influences accuracy of their machining.

The force tests are the main method for evaluating quality of a jig that makes it possible to detect flaws of component parts and assembly.

Widely known in the art is a method for determining force characteristic of devices for magnetically holding workpieces, comprising:
   placing a test sample or a workpiece at a first control point on the plate surface with the device turned-off;
   turning the device on;
   stripping the test sample from the device in the turned-on position through a dynamometer in the direction at right angles to the surface of the device and recording the stripping force;
   demagnetizing the device;
   placing the test sample at a second control point, and so on.

Stripping off the test sample is effected in a succession along a test line at a pre-set spacing. Thus, a maximum advance where a user can get trustworthy and sufficiently detailed information on the distribution of the forces of attraction along the surface of the device is about 1/7 of the test diameter.

The test results are plotted in the form of a broken line, numbers of control points being plotted on the abscissa and values of attraction forces at these points being plotted on the ordinates, and the resultant points are interconnected by a broken line.

It will be apparent that the shorter the distance between the control points being interconnected, the closer is the resultant broken line to the actual force characteristic of the device. At the same time, an increase in the number of control points results in a substantial increase in the test time.

All preparatory and measurement operations connected with a force control at one point of the plate take about three minutes. Bearing in mind that such control should be effected at more than 170 points for an electromagnetic plate of a size 320×1250 mm, it will be understood that the control time of such a device is commensurable with the time needed for its manufacture (the force test is carried out for over 8 hours). It is obvious that such tests will take a much longer time for plates of larger size as 630×2500 mm.

At the same time, even such long tests will not always allow actual values of minimum attraction forces to be revealed because of their discontinuous nature as control points may not coincide with zones of application of minimum forces of attraction.

Therefore, the prior art methods for controlling force characteristic of holding devices take a long time and do not make it possible to obtain a comprehensive force characteristic of the device. It should be noted that reducing the test time (reduction of the number of control points) results in a lower reliability of the test results and, vice versa, an improvement of reliability of the control results (an increase in the number of control points) calls for a substantial increase in the test time.

SUMMARY OF THE INVENTION

The invention is based on the problem of providing a method for determining force characteristic of devices for magnetically holding workpieces which allows a full force characteristic of the device to be obtained with a short test time.

This problem is solved by a method for determining force characteristic of a device for magnetically holding workpieces installed on a top plate of the device, comprising connecting a workpiece cooperating with a source of magnetic field of the device to a force indicator and causing the workpieces to move along a test line, according to the invention, the source of magnetic field is held permanently energized during the tests, the workpiece is placed in parallel with the top plate with a clearance therebetween which depends on sensitivity of the force pick-up and is caused to move continually along the test line while maintaining the amount of the clearance substantially constant.

The method for determining the force characteristic of devices for magnetically holding workpieces by continuously providing a magnetic force of attraction between the workpiece and the top plate according to the invention makes it possible to obtain a comprehensive force characteristic of the device while minimizing the test period, with the force test period being more than 10 times shorter than previous test periods.

BRIEF DESCRIPTION OF THE DRAWINGS

Specific embodiments of the method according to the invention will now be described with reference to the accompanying drawings, in which.

PREFERRED EMBODIMENT OF THE INVENTION

Figure 1:
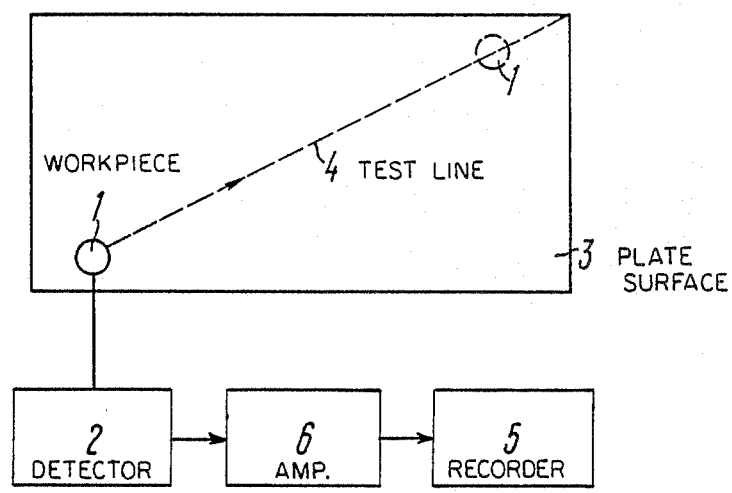
FIG. 1 is a block-diagram of a device for carrying out a method according to the invention.

For determining force characteristic of a device for magnetically holding workpieces, a test sample or workpiece 1 (FIG. 1) is connected to a force detector or indicator 2 (i.e. an attraction force pick-up). The workpiece 1 is then placed in parallel with the surface 3 of a top plate of the device cooperating with a source of magnetic field (not shown) with a clearance δ (FIG. 2) which depends on sensitivity of the pick-up 2 (FIG. 1).

Figure 2:
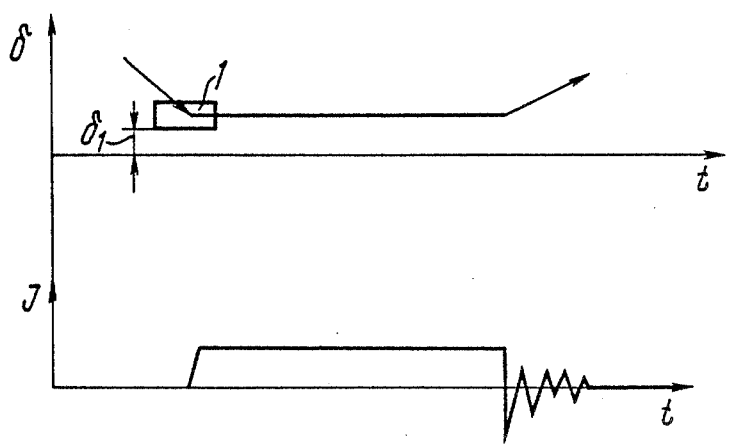
FIG. 2 shows movement of a test sample and energization and deenergization of a device during such movement, according to the invention.

The higher the sensitivity of the pick-up 2, the larger is the clearance δ (FIG. 2). In practice, the clearance may range from hundreths of millimeter to several millimeters.

The source of magnetic field remains permanently energized during the tests so that the magnetic force of attraction is continuously provided. The workpiece 1 is continually moved with the pick-up 2 uniformly along a test line 4 over the surface 3 of the plate. The clearance between the workpiece 1 and the surface 3 is held substantially constant during movement of the workpiece 1. The workpiece 1 is caused to move by any appropriate known means.

Readings generated at the output of the force pick-up 2 characterize the force of attraction of the workpiece 1 to the surface 3 of the plate at each point over which the workpiece 1 moves. These readings are continuously recorded by means of an instrument 5 so that variations in the force of attraction can be determined. The instrument 5 is preferably a self-recorder shown at the same reference numeral 5. An amplifier 6 may be used, if necessary, to provide a signal to the instrument 5.

During the tests, current I that flows through an electromagnetic coil of the device is held constant during the whole time t of movement of the sample 1 placed at a distance $\delta_1$ from the surface 3 of the device plate as shown in FIG. 2.

Calibration of the instrument 5 (graduation of its scale in units of attraction force) is carried out by known methods by stripping a sample off the device in the energized position at one or two points along the test line 4, recording the stripping force and determining readings of the instrument 5 when the sample 1 is over these points.

Figure 3:
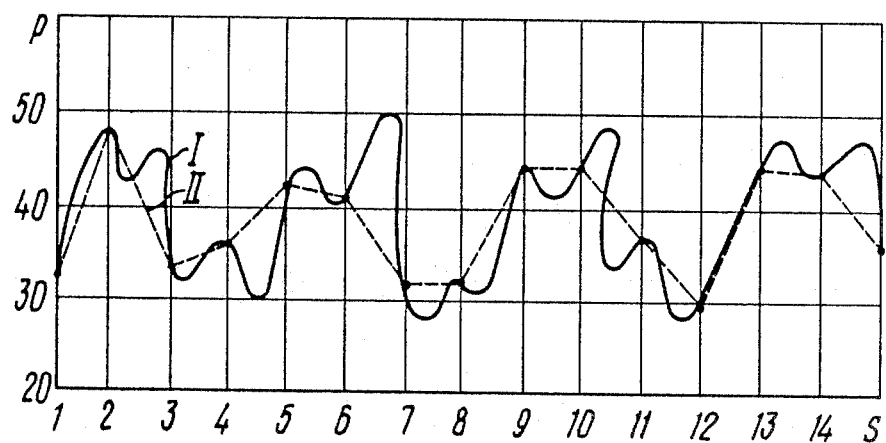
FIG. 3 shows force characteristics of a device obtained using the method according to the invention and prior art.

The recorder 5 will continuously record attraction force during the tests and will plot a force characteristic I shown in FIG. 3. FIG. 3 shows a plot of specific attraction force P, in $N/cm^2$, as a function of the distance S, in cm, through which the workpiece 1 has been moved along the test line 4.

Figure 4:
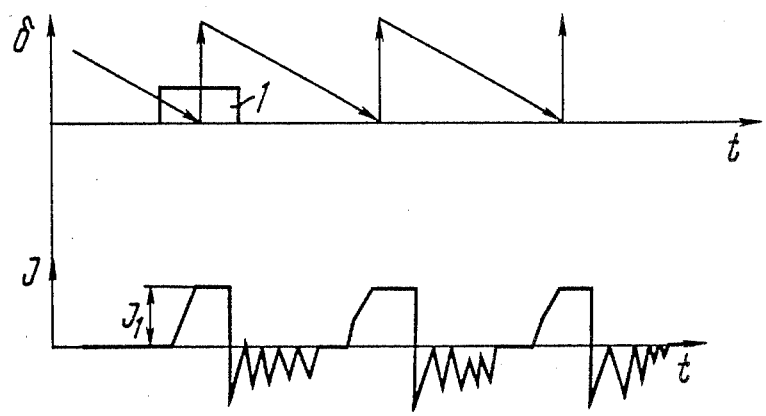
FIG. 4 is an illustration similar to FIG. 2, but with the use of a prior art method for determining force characteristic.

Numbers of points of stripping of a sample during force tests using the prior art method illustrated by a chart shown in FIG. 4 are plotted along the S-axis.

When force characteristic of the device is determined by the prior art method, the workpiece 1 is placed on the surface of the plate 1 (δ=0) of the device which is deenergized, the device is then energized (I×$I_1$) and the workpiece is stripped off the surface of the device; the value of the stripping force is recorded at each point, and these values are plotted in the P and S coordinates and interconnected by a broken line II (dotted line in FIG. 3).

Comparison of lines I and II in FIG. 3 shows that the method according to the invention makes it possible to reveal in the most comprehensive manner the location of zones of minimum forces of attraction of the surface 3 of the device plate and to determine accurately the value of these forces. This allows machining conditions for workpieces held on the device to be sufficiently accurately determined and makes it possible to ensure reliability and safety of the device in operation.

A pilot sample of a device for determining force characteristic of magnetic workpiece holders according to the invention was manufactured for force testing of electromagnetic plates of a size 200×400 mm with a test sample 10 mm in diameter. The tests showed that the device recorded the full force characteristic of the plate in 5 to 10 minutes.

Tests of the same plate using the prior art method showed that all values of stripping forces applied to the test sample at control points coincided with corresponding points of the continuous curve obtained using the method according to the invention.

INDUSTRIAL APPLICABILITY

The method according to the invention may be most advantageously used for determining force characteristic of devices for magnetically holding workpieces installed on grinders, millers and planers as well as on other machine tools.

We claim:

1. A method for determining a force characteristic of a device for magnetically holding workpieces placed on a top plate of the device, wherein a source of magnetic field attracts a workpiece to said top plate of the device, comprising the steps of
    connecting the workpiece to a force indicator which indicates a magnetic force of attraction between said workpiece and said top plate of the device,
    permanently energizing the source of magnetic field during a test period to continuously provide said magnetic force of attraction and minimize the duration of said test period,
    aligning the workpiece so that it is placed in parallel with the top plate,
    providing a clearance between said workpiece and said top plate in an amount which depends on sensitivity of the force indicator,
    continually and uniformly moving said workpiece along said top plate along a test line,
    maintaining the amount of the clearance substantially unchanged,
    generated a signal at an output of said force indicator in proportion to the magnetic force of attraction throughout movement of said workpiece along said test line, and
    recording said signal continuously so that variations in the magnetic force of attraction can be determined.

* * * * *